(12) United States Patent
Rouet et al.

(10) Patent No.: US 8,922,552 B2
(45) Date of Patent: *Dec. 30, 2014

(54) IMAGE PROCESSING METHOD FOR AUTOMATIC ADAPTATION OF 3-D DEFORMABLE MODEL ONTO A SUBSTANTIALLY TUBULAR SURFACE OF A 3-D OBJECT

(75) Inventors: Jean-Michel Rouet, Paris (FR); Maxim Fradkin, Paris (FR); Shérif Makram-Ebeid, Dampierre (FR)

(73) Assignee: Koninklijke Philips N.V., Eindhoven (NL)

( * ) Notice: Subject to any disclaimer, the term of this patent is extended or adjusted under 35 U.S.C. 154(b) by 1457 days.

This patent is subject to a terminal disclaimer.

(21) Appl. No.: 10/542,122

(22) PCT Filed: Jan. 12, 2004

(86) PCT No.: PCT/IB2004/000063
§ 371 (c)(1),
(2), (4) Date: Jul. 12, 2005

(87) PCT Pub. No.: WO2004/063988
PCT Pub. Date: Jul. 29, 2004

(65) Prior Publication Data
US 2006/0098007 A1    May 11, 2006

(30) Foreign Application Priority Data
Jan. 15, 2003  (EP) .................................. 03290106

(51) Int. Cl.
*G06T 17/00*   (2006.01)
*G06T 15/00*   (2011.01)
*G06T 7/00*    (2006.01)
*G06T 17/20*   (2006.01)

(52) U.S. Cl.
CPC ............... *G06T 17/20* (2013.01); *G06T 7/0089* (2013.01); *G06T 2207/10072* (2013.01); *G06T 2200/04* (2013.01); *G06T 2207/30101* (2013.01); *G06T 2207/30061* (2013.01); *G06T 2207/30028* (2013.01); *G06T 7/0083* (2013.01)
USPC .......................................... 345/420; 345/419

(58) Field of Classification Search
None
See application file for complete search history.

(56) References Cited

U.S. PATENT DOCUMENTS 4,791,567 A * 12/1988 Cline et al. .................... 345/424
5,870,105 A *  2/1999 Jensen .......................... 345/441

(Continued)

FOREIGN PATENT DOCUMENTS

EP      1204075 A1    5/2002
WO      0079481 A1   12/2000

(Continued)

OTHER PUBLICATIONS

Flórez-Valencia et al. 3D Graphical Models for Vascular-Stent Pose Simulation. ICCVG. 2002. pp. 1-8.*

(Continued)

*Primary Examiner* — Joni Richer
*Assistant Examiner* — Yi Wang

(57) ABSTRACT

An image processing method, comprising acquiring an image of a 3-D tubular object of interest to segment; computing a 3-D path that corresponds to the centerline of the tubular object and defining segments on said 3-D path; creating an initial straight deformable cylindrical mesh model, of any kind of mesh, with a length defined along its longitudinal axis equal to the length of the 3-D path; dividing this initial mesh model into segments of length related to the different segments of the 3-D path; computing, for each segment of the mesh, a rigid-body transformation that transforms the initial direction of the mesh into the direction of the related segment of the 3-D path, and applying this transformation to the vertices of the mesh corresponding to that segment. The method comprises avoiding self-intersections in the bent regions of the tubular deformable mesh model and sharp radius changes from one segment of the mesh model to the other, by adapting or modulating the radius of the cylindrical deformable mesh model according to the local curvature of the 3-D path, sample distance of the path points and a predefined input radius.

14 Claims, 4 Drawing Sheets

(56) References Cited

U.S. PATENT DOCUMENTS

| | | | |
|---|---|---|---|
| 5,891,030 A * | 4/1999 | Johnson et al. | 600/407 |
| 6,047,080 A | 4/2000 | Chen et al. | |
| 6,083,162 A * | 7/2000 | Vining | 600/407 |
| 6,201,543 B1 | 3/2001 | O'Donnell et al. | |
| 6,346,940 B1 * | 2/2002 | Fukunaga | 345/427 |
| 6,366,800 B1 * | 4/2002 | Vining et al. | 600/425 |
| 6,501,848 B1 | 12/2002 | Carroll et al. | |
| 6,771,262 B2 * | 8/2004 | Krishnan | 345/424 |
| 6,856,324 B2 * | 2/2005 | Sauer et al. | 345/633 |
| 7,130,457 B2 * | 10/2006 | Kaufman et al. | 382/128 |
| 2002/0033821 A1 | 3/2002 | Sfarti | |
| 2002/0136440 A1 | 9/2002 | Yim et al. | |
| 2003/0056799 A1 * | 3/2003 | Young et al. | 128/922 |

FOREIGN PATENT DOCUMENTS

| | | | |
|---|---|---|---|
| WO | 0126055 A2 | 4/2001 | |
| WO | 0137219 A1 | 5/2001 | |

OTHER PUBLICATIONS

Hernández-Hoyos et al. Computer-Assisted Analysis of Three-Dimensional MR Angiograms. Radiographics. vol. 22. 2002. pp. 421-436.*

Yim et al. Vessel Surfvace Reconstruction With a Tubular Deformable Model. IEEE Transactions on Medical Imaging. vol. 20. Dec. 2001. pp. 1411-1421.*

Alexa. Linear Combination of Transformations. ACM Transactions on Graphics. vol. 21. Issue 3. Jul. 2002. pp. 380-387.*

Williams et al. Rational Discrete Generalized Cylinders and their Application to Shape Recovery in Medical Images. Proceedings of the 1997 Conference on Computer Vision and Pattern Recognition. 1997. pp. 387-392.*

Montagnat et al. Globally Constrained Deformable Models for 3D Object Reconstruction. vol. 71. Issue 2. 1998.*

Montagnat et al. A Hybrid Framework for Surface Registration and Deformable Models. Proceedings of the 1997 Conference on Computer Vision and Pattern Recognition. 1997. pp. 1041-1046.*

Aylward. Initialization, Noise, Singularities, and Scale in Height Ridge Traversal for Tubular Object Centerline Extraction. IEEE Transactions on Medical Imaging. vol. 21. Issue 2. Feb. 2002. pp. 61-75.*

Greenspan et al. Evaluation of Center-Line Extraction Algorithms in Quantitative Coronary Angiography. IEEE Transactions on Medical Imaging. vol. 20. Issue 9. Sep. 2001. pp. 928-941.*

Hernández-Hoyos et al. A Deformable Vessel Model with Single Point Initialization for Segmentation, Quantification and Visualization of Blood Vessels in 3D MRA. Medical Image Computer and Computer Assisted Invention. Oct. 2000. pp. 735-745.*

Dumoulin et al. Mechanical Behaviour Modelling of Balloon-Expandable Stents. Journal of Biomechanics. 2000. pp. 1461-1470.*

Ramirez Flores et al. Basic Three-Dimensional Objects Constructed with Simplex Meshes. 1st International Conference on Electrical and Electronics Engineering. Jun. 2004. pp. 166-171.*

Takashi MaeKawa et al., "Analysis and applications of pipe surfaces", Jul. 1997, Computer Aided Geometric Design 15 (1998) 437-4584.*

H. Delingette in the publication entitled "Simplex Meshes: a General Representation for 3D shape Reconstruction" in the "processing of the International Conference on Computer Vision and Pattern Recognition (CVPR'94), Jun 20-24, 1994, Seattle, USA".

* cited by examiner

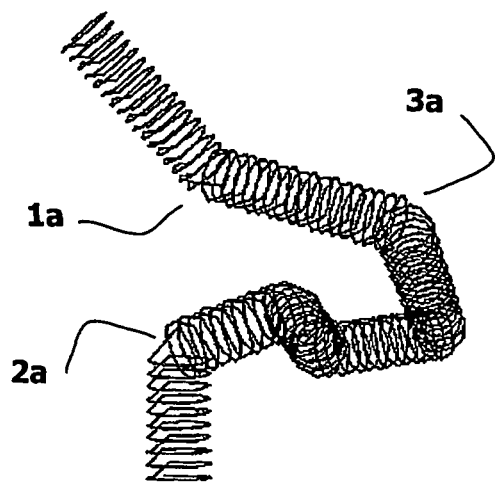
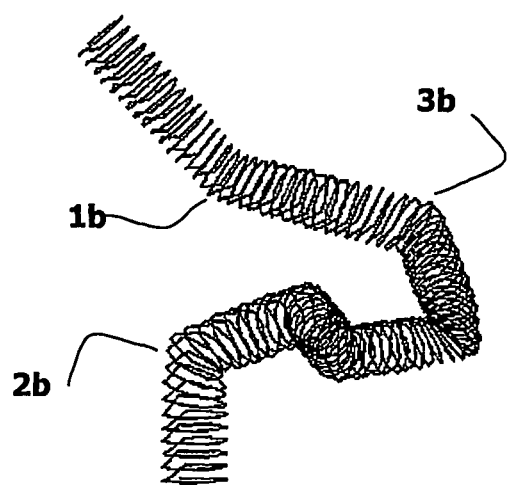
FIG.3A  FIG.3B
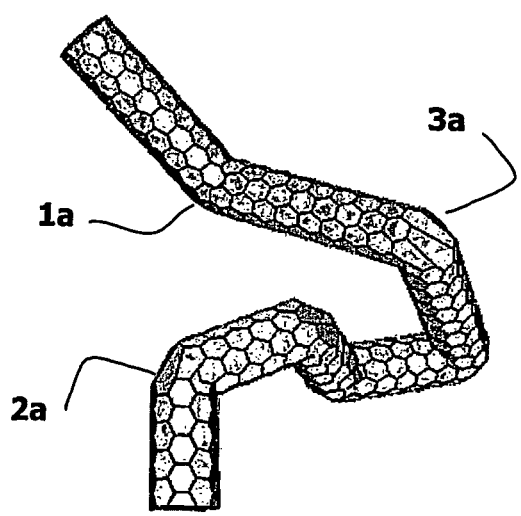
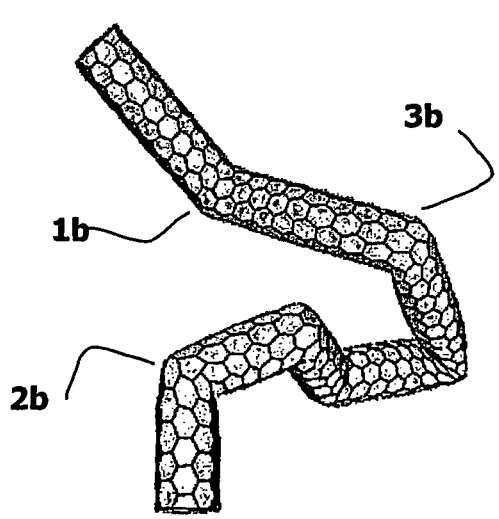
FIG.4A  FIG.4B

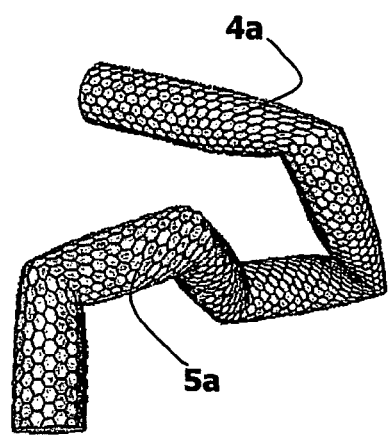
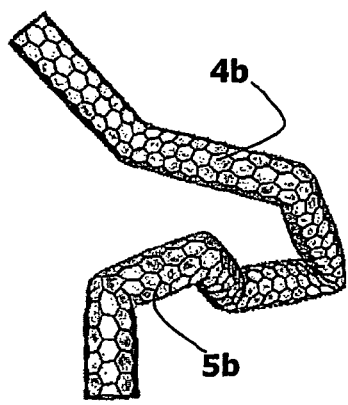
FIG.7A  FIG.7B
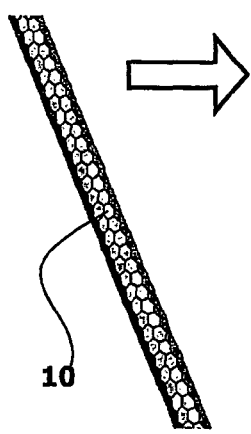
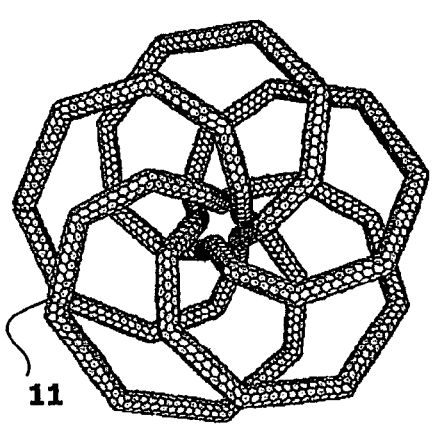
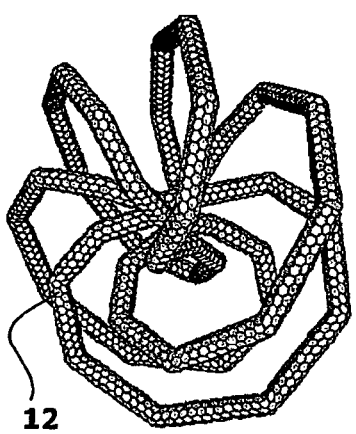
FIG.8A  FIG.8B  FIG.8C
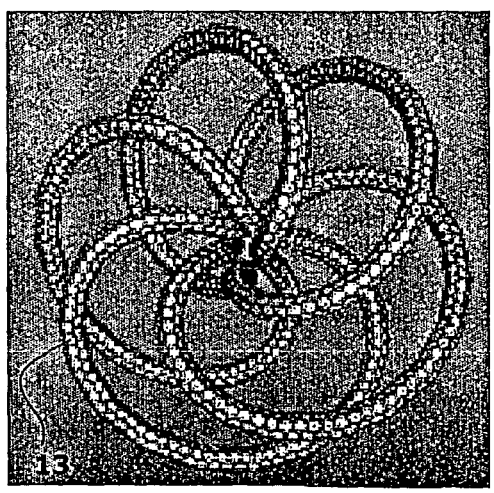
FIG.8D

US 8,922,552 B2

IMAGE PROCESSING METHOD FOR AUTOMATIC ADAPTATION OF 3-D DEFORMABLE MODEL ONTO A SUBSTANTIALLY TUBULAR SURFACE OF A 3-D OBJECT

FIELD OF THE INVENTION

The invention relates to an image processing method for automatic adaptation of a 3-D deformable mesh model onto a substantially tubular surface of an object in a medical image. The invention applies to methods of segmentation of a three dimensional tubular object in a three dimensional image, which often comprises an operation of fitting a three-dimensional discrete deformable model onto said three-dimensional tubular object. The invention further relates to medical imaging apparatus or systems and to program products for processing medical three-dimensional images produced by those apparatus or systems, for the segmentation of objects that are body organs such as colon or arteries in order to study or detect organ pathologies. The invention finds a particular application in the field of medical imaging methods, program products and apparatus or systems.

BACKGROUND OF THE INVENTION

A technique of modelization of a 3-D object is already disclosed by H. DELINGETTE in the publication entitled "Simplex Meshes: a General Representation for 3D shape Reconstruction" in the "processing of the International Conference on Computer Vision and Pattern Recognition (CVPR '94), 20-24 Jun. 1994, Seattle, USA". In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. A Simplex Mesh has constant vertex connectivity. For representing 3-D surfaces, Simplex Meshes, which are called two-Simplex Meshes, where each vertex is connected to three neighboring vertices, are used. The structure of a Simplex Mesh is dual to the structure of a triangulation as illustrated by the FIG. 1 of the cited publication. The contour on a Simplex Mesh is defined as a closed polygonal chain consisting of neighboring vertices on the Simplex Mesh. Four independent transformations are defined for achieving the whole range of possible mesh transformations. They consist in inserting or deleting edges in a face. The description of the Simplex Mesh also comprises the definition of a Simplex Angle that generalized the angle used in planar geometry; and the definition of metric parameters, which describe how the vertex is located with respect to its three neighbors. Dynamic of each vertex is given by a Newtonian law of motion. The deformation implies a force that constrains the shape to be smooth and a force that constrains the mesh to be close to the 3-D object. Internal forces determine the response of a physically based model to external constraints. The internal forces are expressed so that they be intrinsic viewpoint invariant and scale dependant. Similar types of constraints hold for contours. Hence, the cited publication provides a simple model for representing a given 3-D object. It defines the forces to be applied in order to reshape and adjust the model onto the 3-D object of interest.

SUMMARY OF THE INVENTION

In medical images, it is often required to segment a tubular organ like the colon or an artery. A segmentation based on discrete deformable models allows to extracting clinical parameters of the studied organ like the diameter or the volume. Problems arise when the discrete deformable model, whether of the kind called two-Simplex Mesh, triangular Mesh or of any other kind of active contour Models, must fit such a tubular organ that presents numerous bends. These bends may have different curvatures, defined by small or large curvature radii.

It is an object of the present invention to propose an image processing method of creating a deformable model, with 2-simplex meshes or triangular meshes or any other kind of meshes, having a tubular structure for fitting a previously defined 3-D path composed of a set of ordered points. This 3-D path may correspond to the centerline of an object of interest, i.e. a tubular organ showing bends. Thus, said 3-D path may present all kinds of curvatures. It is a further object of the present invention to propose such an image processing method for automatic adaptation of the mapping of the 3-D deformable tubular model onto the 3-D surface of the tubular object of interest showing different bends. The object of interest may be represented in a gray level 3-D image. This method comprises: computing a 3-D path that corresponds to the centerline of a tubular object of interest to segment; defining segments on said 3-D path; creating an initial straight deformable cylindrical mesh model, of any kind of mesh, with a length defined along its longitudinal axis equal to the length of the 3-D path; dividing this initial mesh model into segments of length related to the different segments of the 3-D path; and computing for each segment of the mesh, a rigid-body transformation that transforms the initial direction of the mesh into the direction of the related segment of the 3-D path, and applying this transformation to the vertices of the mesh corresponding to that segment.

Now, a key problem lies in the potential apparition of self-intersections of the mesh model when, due to the bends of the 3-D path, the direction between two consecutive segments of the 3-D path changes quickly.

It is an object of the present invention to propose such an image processing method capable of limiting self-intersections of the deformable mesh model. For limiting self-intersections, the proposed method does not use a unique transformation for each segment, but instead, the proposed method comprises computing transformations related to following segments, which transformations, are blended in between two consecutive segments. This technique is called 3-D rigid body transformation blending. When rotations are used for following the directions of segments, a linear interpolation can be used between two rotations for rotation blending. This linear interpolation, from one 3-D rigid body transformation to another one can be solved using the formalism of Quaternions.

An advantage of this technique of 3-D rigid body transformation blending is that the creation of the mesh model according the proposed method does not need to impose a kind of mesh model rather than another kind. The proposed method can be applied to mesh model of any kind: 2-simplex mesh, triangular mesh or any other kind of transformable model.

Linear interpolation of 3-D rigid transformation from one segment to the other does not always suffice to completely avoid self-intersections. Clearly, such self-intersections also depend on the relation between the local curvature of the 3-D path and the desired radius of the created discrete deformable model. If the latter is larger than the local radius of curvature, then self-intersections occur.

It is an object of the present invention to propose such an image processing method capable of avoiding possible self-intersections in the regions of the tubular deformable model showing bends. The method of the present invention comprises modulating the radius of the cylindrical deformable model according to the local curvature. First, since the target 3-D path can be nothing more than a mere list of points, local curvature can be approximated. Then, the radius of the mesh model is restricted in function of the curvature. However, in order to avoid sharp radius changes from one segment of the model to the other, a radius modulation technique is applied to the radius of the mesh model, such as linear blending or bi-cubic spline interpolation from one radius to the other.

An advantage of this technique of radius modulation is that the surface of the mesh model, in the parts with restricted radius obtained by radius modulation, does not present any discontinuity. The surface passes smoothly from a part of a given radius to another part of restricted radius. Hence the mesh model does not appear to be deformed. Another advantage of this technique of radius modulation is that it permits an improved segmentation of the complex organ of interest in regions where numerous folding up may make visualization or following of all the parts of this organ difficult. The visualization is improved.

Another advantage of this technique of radius modulation is that the creation of the mesh model according the proposed method does not need to apply truncation to the self-intersecting parts of the bends, since the radius of the mesh model is restricted. The avoided alternative of truncation is a kind of operation that those skilled in the art know to apply to the parts of the bends that self-intersects. Such truncation could be a solution for avoiding self-intersections, but presents drawbacks such as suppression of information in the regions of curvatures and un-natural abrupt folds, which the present invention has for advantage to avoid.

Still another problem may be lack of continuity control of the above-cited transformation, which can be seen as mesh torsion in the model.

It is a further object of the present invention to propose such an image processing method capable of minimizing Mesh Torsion. Mesh torsion is minimized when the distance between two consecutive rotations of the rigid-body transformations is minimal. The proposed method comprises computing the minimal 3-D rotation from the initial mesh direction to the target segment. This rotation is defined with an axis parameter and with a rotation angle parameter. The proposed method comprises computing these parameters iteratively from one segment to the other so that the new rotation for a current segment is computed as a composition of the found rotation for the previous segment and the minimal rotation from the previous and the current segment.

The main features of the proposed image processing method are claimed in Claim 1. The method of the invention can favorably be applied to the segmentation of three-dimensional medical images of tubular body organs. The invention also relates to a medical examination imaging apparatus having 3-D image processing means. The medical imaging apparatus may be any 3-D medical examination apparatus having imaging means. The invention further relates to a program product or a program package for carrying out the method.

BRIEF DESCRIPTION OF THE DRAWINGS

The invention is described hereafter in detail in reference to the following diagrammatic drawings, wherein:

FIG. 3A and FIG. 3B illustrate respectively mesh creation without and with linear transformation blending, in circle views;

FIG. 4A and FIG. 4B illustrate respectively mesh creation without and with linear transformation blending, in simplex mesh views;

FIG. 7A and FIG. 7B illustrate mesh creation using the minimal rotation between the local tangent u(s) and the z-axis without and with incremental rotation R(s), in mesh views;

FIG. 8A shows an initial tubular mesh model; FIG. 8B shows a synthetic tortuous example of mesh creation with linear transformation blending and with incremental rotation R(s) leading to torsion minimization; FIG. 8C shows the same example as FIG. 8B in an other orientation; and FIG. 8D shows the same example as FIG. 6B with a finer resolution of the 3-D path;

DESCRIPTION OF THE PREFERRED EMBODIMENTS

The invention relates to an image processing method to be applied for example to a three-dimensional (3-D) digital image represented in gray levels. The image may represent the noisy three-dimensional surface of an organ called object of interest. In order to provide the user with a better view of the object of interest, for instance with respect to the background, this object is segmented. The segmented image permits the user of better studying or detecting abnormalities or diseases of the organ. In the present example, the object of interest is a tubular organ, for instance the colon or an artery or the bronchi. The way the three-dimensional image is acquired is not part of the invention. The segmentation method could be applied to three-dimensional digital images of organs that can be acquired by ultrasound systems or X-ray apparatus or by other systems known of those skilled in the art.

After the acquisition of the three-dimensional image representing the three-dimensional tubular object of interest, said image is segmented. The image segmentation method is based on the utilization of 3-D deformable models, called active contours. According to the invention, any technique of creating a 3-D deformable model can be used without restriction. The segmentation operation consists in mapping the 3-D deformable Model onto a 3-D substantially tubular object of interest, such as a colon or artery. In this example, the object of interest shows a complex tubular shape comprising numerous bends.

In the field of active contours, an initial mesh model has to be provided. Even if it is always possible to start from any arbitrary shape of the mesh model, it is more robust and faster to start with a mesh model whose shape is close to the desired shape of the organ to be segmented. According to the invention, creating an initial mesh model of the kind called simplex mesh, triangular mesh or any other kind of mesh model is proposed, with a tubular structure fitting a 3-D path formed of a set of ordered points. This method is based on the creation of a long straight cylinder, which is in turn bended or deformed to fit the 3-D path.

The difficulty lies in the operation of deforming the straight initial tubular deformable Model appropriately in order to finally map correctly the entirety of the surface of the complex shape of this tubular body organ considering the complexity of said shape.

1) Creating a Tubular Mesh Model

Figure 1:
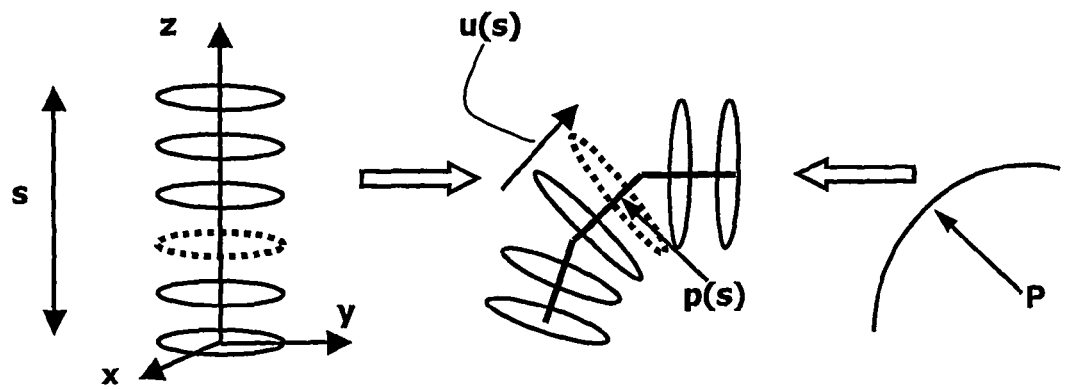
FIG. 1 illustrates the step of mesh bending segment by segment, based on a predetermined path of ordered points.

Referring to FIG. 1, the segmentation of a tubular structure, like a blood vessel or like the colon, comprises to first create a 3-D path P. This 3-D path may advantageously be a centerline of the organ corresponding to said tubular structure. The creation of this 3-D path P may be performed using path-tracking techniques known to those skilled in the art for providing the set of ordered points related the tubular structure. According to the invention, the 3-D path P is converted into a tubular mesh model. The initial mesh model is a cylindrical mesh model. This initial cylindrical mesh model is deformed towards the tubular organ structure data. For this, functionality is needed in order to initialize a mesh model from such a 3-D path P, instead of initializing a mesh model directly with an object surface as in the prior art publication [Delingette].

As mentioned in the introduction, any application aiming at segmenting tubular structures might benefit from an initial mesh model having a tubular shape. Since path-tracking tools are already known to those skilled in the art, they may be used to determine a line of points related to the object of interest such as the centerline of the tubular object of interest to be segmented. Such a 3-D path P, or centerline, can guide trustfully the initialization process of the mesh model, leading not only to a faster but also to a more robust segmentation tool for tubular structures.

According to the invention, the problem to be solved is the creation of the tubular mesh model fitting the tubular organ to be segmented. The different inputs of the problem are:

1) a sorted list of points lying along the 3-D path P. No assumptions are required yet on the regularity and the spacing of these points, but it will be demonstrated further that such constraints can really help in obtaining a smooth mesh model.

2) the radius r of the cylinder, and 3) the resolution of the cells, i.e. the "number of cell subdivisions".

The natural output is a mesh structure.

Referring to FIG. 1, a functionality for creating the cylinder basic form is proposed. This functionality consists in creating along the z-axis of a predefined referential Ox, Oy, Oz, a set of points lying on circular sections of the initial cylindrical mesh model, then linking the sets of points all together to create the simplex mesh structure, and finally applying a rigid body transformation to move this created cylinder, which is initially aligned on the z-axis, towards its desired 3-D location. For generating a 3-D flexible tube called generalized cylinder, the method of the invention comprises starting from a straight cylinder, which is aligned on the z-axis, and which has a length s equal to the total length of the 3-D target path P. Then, the method comprises elastically warping this cylinder in order to fit the given 3-D path.

Referring to FIG. 1, the present method first comprises steps of:

computing a 3-D path related to the tubular object of interest; for example the 3-D path is the centerline of a tubular object of interest to segment;

defining segments on said 3-D path;

creating an initial straight deformable cylindrical mesh model, of any kind of mesh, with a length defined along its longitudinal axis equal to the length of the 3-D path;

dividing this initial mesh model into segments of length related to the different segments of the 3-D path; and computing for each segment of the mesh, a rigid-body transformation that transforms the initial direction of the mesh into the direction of the related segment of the 3-D path, and applying this transformation to the vertices of the mesh corresponding to that segment.

If the starting location of the straight cylinder is chosen to be at z-coordinate 0, then the z-coordinate of each cylinder point can be used as a correspondence with the chord-length parameterization of the 3-D path. For each location p(s) of the path, the direction u(s) of the local tangent is determined. Then, the cylinder points having a z-coordinate equal to s are warped into the plane issued from p(s) and orthogonal to u(s). These basic operations are illustrated by FIG. 1.

However, some artifacts might appear.

First, if the 3-D path is not smooth, for example because large angles exist between two consecutive segments of the poly-line path, then the warped cylinder might cross itself, thus leading into an undesirable self intersecting mesh. Thus, a key problem is the potential apparition of self-intersections when the direction between two consecutive segments changes quickly.

Then, when no care is taken with the choice of the rigid body transformation matching the z-axis into the u(s) orientation, this might lead to an undesirable torsion of the resulting mesh. Thus, another problem is the lack of continuity control, which can be seen as mesh torsion, during the transformation.

2) Limiting or Avoiding Self-Intersections

Figure 2:
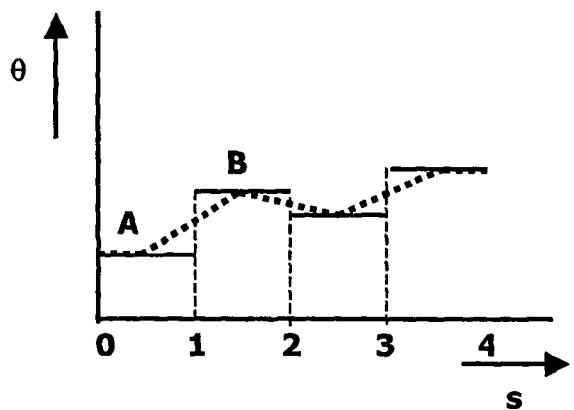
FIG. 2 illustrates the variation of the angle of the local tangent u(s) to the 3-D path with respect to the z-axis of the referential of the initial tubular model.

A first cause of self-intersections is the rapid change of direction u(s) between two consecutive segments of the poly-line path. If the angle, denoted by θ, between the local tangent u(s) and the z-axis is plotted, a step-curve formed of steps as shown in FIG. 2 is obtained. The steps are the horizontal segments A, B, . . . , represented in continuous lines in FIG. 2. Since this angle θ is directly used for computing the rigid-body transformation of each circle, as represented in FIG. 1, reducing the effect of the steps helps preventing self-intersections.

Referring to FIG. 2, for reducing the effect of steps, the computed rotation for operating warping, corresponding to the segment "A" of the 3-D path, will be constant, and all the circles located between z=0 and z=1 will be rotated with the same 3-D rotation. Similarly, all the circles corresponding to segment "B", i.e. having a z-coordinate in the range [1 . . . 2], will move with the same rigid body transformation. It is to be noted that, not only a 3-D rotation angle has to computed, but also a rotation axis, and similarly to the rotation angle, the rotation axis is piecewise constant along the s coordinate.

2a) Limiting Self-Intersections by Using Linear Blending

Self-intersections can be avoided if a unique transformation is not applied for each segment. Instead, the transformations are blended in between two consecutive segments using linear interpolation between two rotations. This linear interpolation from one 3-D rigid body transformation to another one can be easily solved using the formalism of Quaternions. Hence, according to the invention, in order to limit the self-intersections, the method comprises linearly blending the 3-D transformation between each segment, i.e. replacing the step-curve formed of segments A, B, etc, by the continuous curve represented by a doted line in FIG. 2. This linear blending is achieved by considering the 3-D rotations as Quaternions (denoted by $Q_1$, and $Q_2$) with a quaternion of the form shown in (1):

$$Q = \cos\frac{\theta}{2} + (Lu_x + j \cdot u_y + k \cdot u_z)\sin\frac{\theta}{2} \quad (1)$$

where $\theta$ is the rotation angle, and $(u_x, u_y, u_z)$ the rotation axis. The blending itself is then straightforwardly a normalized linear combination of the two Quaternions $Q_1$, $Q_2$:

$$\hat{Q} = \frac{(1-t) \cdot Q_1 + t \cdot Q_2}{\|(1-t) \cdot Q_1 + t \cdot Q_2\|} = \cos\frac{\theta'}{2} + (i \cdot u'_x + j \cdot u'_y + k \cdot u'_z)\sin\frac{\theta}{2} \quad (2)$$

Non-linear blending could be investigated. But, for the example of tubular organ segmentation, the linear blending was proven stable enough.

FIG. 3A and FIG. 3B show the effect of the rotation blending on a 3-D path containing only 8 points, and also having quite large angle change from one segment to the other. In FIG. 3A, it can be seen that, without 3-D rotation blending, the different circles intersect at the junction points, such as at points 1a, 2a, 3a, and the generated simplex mesh contains some self-intersections. In FIG. 3B, it can be seen that the linear blending of the rotations helps the different circles to being deformed smoothly from one direction to the following one, resulting in a much more regular mesh, as shown at points 1b, 2b, 3b.

2b) Avoiding Self-Intersections by Using Automatic Radius Modulation

Linear blending of 3-d rigid transformation from one segment to the other does not always suffice to avoid self-intersections. Clearly, such self-intersections also depend on the relation between the local curvature of the 3-D path and the desired radius of the created mesh. If the latter is larger than the local radius of curvature, knowing that the radius of curvature is inversely proportional to the curvature, thus it is small when the curvature is high, then self-intersections occur. Thus, even if a smooth evolution of the rigid body transformation along with the s-coordinate is assured by the above-described operation of linear-blending, some self-intersection might still appear. The relation that exists between the radius, denoted by r, of the initial cylinder, the distance separating two consecutive circles, and the curvature, denoted by c, of the 3-D path, might influence the creation of such self-intersections. Trying to warp a cylinder with a large radius r on a very bent path will certainly lead to some serious problems. Hence, it is desirable to automatically reduce locally the diameter of the cylinder in highly curved zones. According to the invention, the mesh radius is adapted automatically, based on the curvature and sample distance of the points and the desired input radius. The method for tubular mesh creation comprises modulating the radius of the cylindrical mesh according to the local curvature. A shrinking factor combined with the 3-D rotation is calculated, thus leading to a similarity transform, provided that the curvature of the 3-D path can be computed at any point. Since the invention is related to organs, it is assumed that the provided polyline is smooth enough to use simple approximations. The curvature c(t) at curvilinear coordinate s=t of the 3-D path is computed as:

$$c(t) = \left\| \frac{\overrightarrow{\partial p}}{\partial s} \cdot \frac{\overrightarrow{\partial^2 p}}{\partial s^2} \right\| / \left\| \frac{\overrightarrow{\partial p}}{\partial s} \right\|^3 \quad (3)$$

where the first and second derivatives of the path are estimated with formulations (4) and (5):

$$\frac{\overrightarrow{\partial p}}{\partial s}(t) \approx \frac{\overrightarrow{p_{t-1}p_{t+1}}}{\|\overrightarrow{p_{t-1}p_t}\| + \|\overrightarrow{p_t p_{t+1}}\|} \quad (4)$$

$$\frac{\overrightarrow{\partial^2 p}}{\partial s^2}(t) \approx \frac{4(\overrightarrow{p_t p_{t-2}} + \overrightarrow{p_t p_{t+2}})}{(\|\overrightarrow{p_t - 2p_{t-1}}\| + \|\overrightarrow{p_{t-1}p_t}\|\|\overrightarrow{p_t p_{t+1}}\| + \|\overrightarrow{p_{t+1}p_{t+2}}\|)^2} \quad (5)$$

This is only valid when the length of each segment tends to zero and when they are quite homogeneous. To overcome this small regularity problem and to avoid large variation of the estimated curvature, a Gaussian filtering of the curvature values can be applied. Finally the computed curvature value for each point of the 3-D path is used to apply a shrinking factor to the different circles of the cylinder. This shrinking factor, denoted by k, depends on the radius of the initial cylinder r and the estimated radius of curvature, equal to 1/c, of the 3-D path:

$$k = \begin{cases} 1 & \text{if } r \cdot c(t) \leq 1 \\ 1/(r \cdot c(t)) & \text{elsewhere} \end{cases} \quad (6)$$

Optionally, as with the rotation blending above, the shrinking factor can also be blended. The radius modulation technique can use a linear blending based on:

$$(1-u)c(t_0) + uc(t_1) \quad (7)$$

with $u = \tau = (t - t_0)/(t_1 - t_0)$, \quad (8)

or this radius modulation technique can use a bi-cubic spline interpolation can be used, where u is replaced by v so that:

$$v = 3\tau^2 - 2\tau^3. \quad (9)$$

Figure 5:
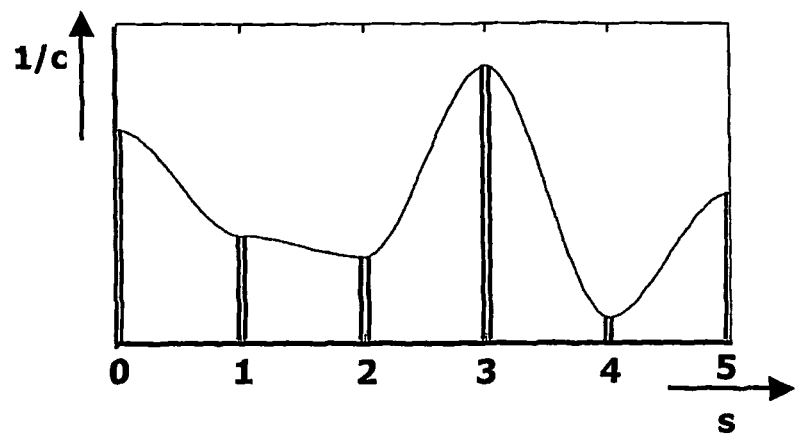
FIG. 5 shows an example of bi-cubic spline interpolation on computed curvatures.

FIG. 5 shows an example of bi-cubic interpolation on computed curvatures. The curvilinear coordinates s relates to the segment indices. The bold lines represent some sample values of radius of curvatures 1/c, where c is the curvature, computed at locations s=0 through s=5. And the curve represented by a fine line shows the bi-cubic interpolation of these sparse data. The advantage of using a bi-cubic interpolation here in comparison with a linear one is that the function has a continuous derivative (the tangents at the junction points are horizontal), hence the variation of the cylinder radius will vary slower.

After all these precautions, if self-intersections still exists, then automatic mesh repairing, smoothing with internal force of the active contour algorithm might be applied, as described in the introduction part in relation with the transformations described in the prior art.

Figure 6A:
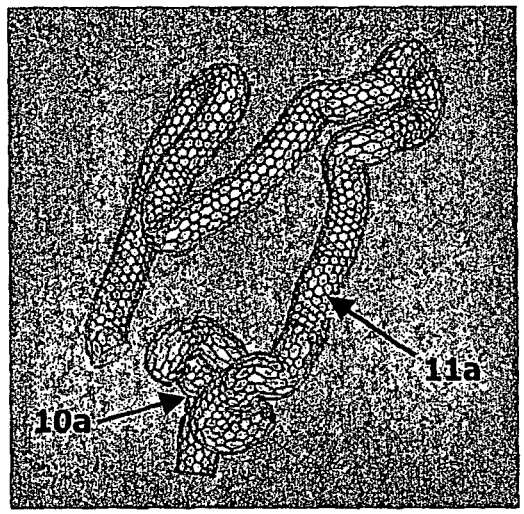
FIG. 6A shows an example of mesh model creation with linear transformation blending and torsion minimization, from the path of a centerline of a colon.
Figure 6B:
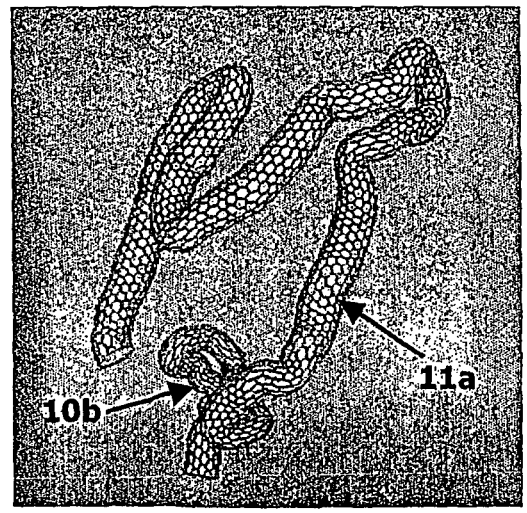
FIG. 6B shows the example of FIG. 6A related to a mesh model following the path of a centerline of a colon, further modified by a step of radius modulation.

FIG. 6A and FIG. 6B illustrate the benefit of automatic radius modulation. FIG. 6A and FIG. 6B show an example of mesh creation from a path in the colon. In FIG. 6A, where the mesh model is created without using radius modulation, the colon mesh self-intersects in the bottom part 10a, where the 3-D path is very tortuous. Also, it very difficult to visualize some regions of the colon that are hidden by the bends of other regions. In FIG. 6B, where the mesh model is created using the radius modulation algorithm, the self-intersections are largely reduced as shown in 10*b*. However, the general shape of the colon is not perturbed in the regions of restricted radii. In the other parts such as 11*a*, the radius is unchanged between FIG. 6A and FIG. 6B. In the regions of restricted radii, the visualization and following of the different regions of the colon is greatly improved.

3) Imposing Minimal Torsion

Mesh torsion is minimized when the distance between two consecutive rotations, i.e. rigid-body transformations, is minimal. The 3-D rotation is computed as the minimal rotation from the initial mesh direction, which is the z-axis, to the target segment u(s). This rotation is defined with an axis R=z^u(s), and with angle θ=angle(z,u(s)). According to the invention, the parameters constituted by the axis R and the angle θ are computed iteratively from one segment to the other. Thus, this method comprises computing the new rotation for a current segment u(s+1) as a composition of the found rotation for the previous segment u(s) and the minimal rotation from the previous segment u(s) to the current segment u(s+1). In fact, there is no unique 3-D rigid body transformation that maps the z-axis into the u(s) direction, which is the local tangent of the 3-D path. If a translation is needed, such a translation is easy to compute. But, the core problem consists in finding a 3-D rotation transforming the $\vec{z}$ vector (0,0,1) into $\vec{u(s)}=(u_x, u_y, u_z)$. The simplest rotation is the rotation around axis:

$$\vec{R}=\vec{z}\wedge\vec{u(s)},\qquad(10)$$

which reduces to $\vec{R}=(-u_y,u_x,0)$, with a rotation angle θ equals to:

$$\theta=\arccos(u_z/\|\vec{u(s)}\|)\qquad(11)$$

This rotation, which may be called for simplicity:

$$\hat{R}(\vec{z},\vec{u(s)})\qquad(12)$$

maps the $\vec{z}$ vector to the $\vec{u(s)}$ direction, but any other rotation composed of a rotation around the z-axis (leaving the z-direction untouched) followed by $\hat{R}(\vec{z},\vec{u(s)})$ does it as well. Nevertheless, only one rotation fulfills the condition of minimal displacement and it is exactly $\hat{R}(\vec{z},\vec{u(s)})$. The problem is that it must be taken care about the fact that no minimal torsion is to be found between $\vec{z}$ and $\vec{u(s)}$, but rather between each step going from $\vec{u(s)}$ to $\vec{u(s+1)}$. Thus the rotation to be computed is not as easy as $\hat{R}(\vec{z},\vec{u(s)})$, but corresponds to the incremental compositions:

$$R(s)=\hat{R}(\vec{z},\vec{u(0)})\cdot\hat{R}(\vec{u(0)},\vec{u(1)})\cdot\ldots\cdot\hat{R}(\vec{u(s-1)},\vec{u(s)}),\qquad(13)$$

where $\hat{R}(\vec{a},\vec{b})$ designates the minimal rotation mapping $\vec{a}$ into $\vec{b}$.

FIG. 7A and FIG. 7B illustrate the use of imposing minimal torsion. FIG. 7A shows an example of mesh creation using only the minimal rotation between the z-axis and u(s). FIG. 7B shows an example of mesh creation using the minimal rotation between the z-axis and u(s) and then the incremental rotation R(s) leading to a minimal torsion. In FIG. 7A, it can be seen that torsion appears on the mesh because the cells are twisted around junction points, for example in regions 4*a* and 5*a*. Instead, in FIG. 7B, the cells are kept aligned all over the mesh. In particular, the cells are well aligned in regions 4*b* and 5*b* corresponding to the regions 4*a* and 5*a* of FIG. 7A.

On a tortuous synthetic example, it can also be observed that the minimal torsion algorithm gives fine results. FIG. 8A represents an initial tubular mesh model from which a tortuous synthetic example is created and represented in FIG. 8B and in FIG. 8C under a different angle of view. FIG. 8D represents the same example, with a finer resolution of the 3-D path. In FIG. 8D, 200 segments were used in the 3-D path while in FIG. 8B and FIG. 8C only 50 segments were used in the 3-D path. In FIG. 8A to FIG. 8D, a straight line has been tagged in white on the initial cylinder 10, allowing to assessing the torsion on the final mesh in following the corresponding lines 11, 12, 13.

4) Desired Initial Conditions

The above described method works with different kinds of 3-D paths. However, the best results are observed when no sharp angles are present. Hence, it is better to preliminary smooth the input 3-D path using any smoothing technique known to those skilled in the art. Still better results are also obtained when the segment lengths of the path are homogeneous.

5) Medical Viewing System and Apparatus

Figure 9:
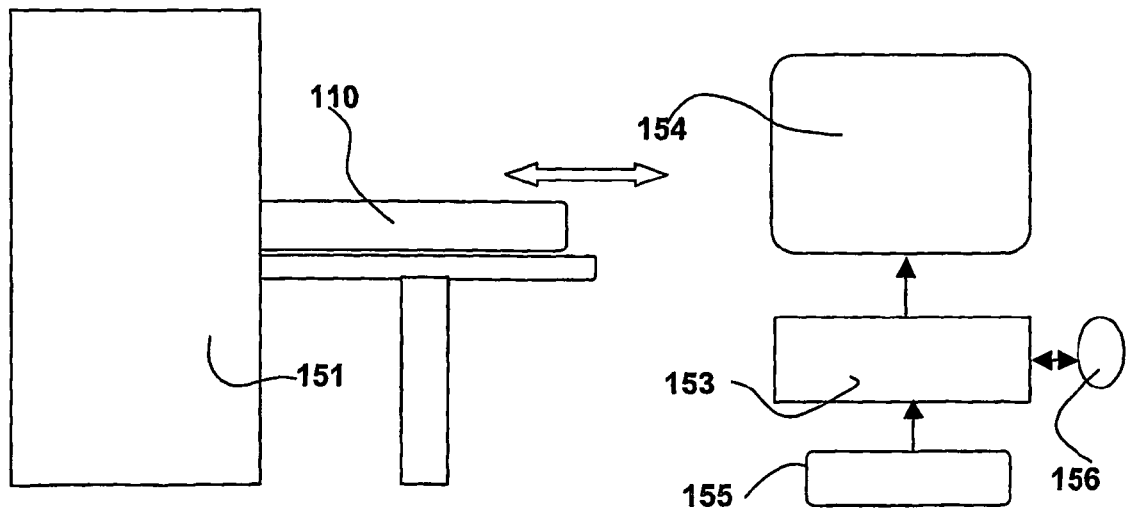
FIG. 9 illustrates a medical viewing system having means for carrying out the image processing method.

The above-described steps can be carried out by the viewing system of the invention. FIG. 9 shows the basic components of an embodiment of an image viewing system in accordance to the present invention, incorporated in a medical examination apparatus. The medical examination apparatus 151 may include a bed 110 on which the patient lies or another element for localizing the patient relative to the imaging apparatus. The medical imaging apparatus 151 may be a CT scanner or other medical imaging apparatus such as x-rays or ultrasound apparatus. The image data produced by the apparatus 151 is fed to data processing means 153, such as a general-purpose computer, that carries out the steps of the method. The data processing means 153 is typically associated with a visualization device, such as a monitor 154, and an input device 155, such as a keyboard, or a mouse 156, pointing device, etc. operative by the user so that he can interact with the system. The data processing device 153 is programmed to implement a method of processing medical image data according to invention. In particular, the data processing device 153 has computing means and memory means to perform the steps of the method. A computer program product having pre-programmed instructions to carry out the method may also be implemented.

The drawings and their description herein before illustrate rather than limit the invention. It will be evident that there are numerous alternatives that fall within the scope of the appended claims. Moreover, although the present invention has been described in terms of generating image data for display, the present invention is intended to cover substantially any form of visualization of the image data including, but not limited to, display on a display device, and printing. Any reference sign in a claim should not be construed as limiting the claim.

The invention claimed is:

1. An image data processing method of automatic adaptation of 3-D surface model to image features, for model-based image segmentation, the method comprising:
   creating a deformable tubular mesh model for fitting a 3-D path based on a centerline of a 3-D tubular object of interest, the 3-D path comprising a set of ordered points defining a plurality of path segments, the mesh model having an initial radius and comprising a plurality of mesh segments corresponding to the plurality of path segments;

determining, for each mesh segment, a value that is a product of the initial radius and a local curvature of the corresponding path segment; and automatically adapting a length of a mesh radius for each mesh segment having the value greater than one, by applying a shrinking factor to the initial radius, wherein the shrinking factor is a constant value for each of the mesh segments to be adapted, the constant value being less than one and based on the initial radius and the radius of local curvature of the corresponding path segment, wherein automatically adapting the mesh radius comprises, modulating the initial radius of the deformable tubular mesh model according to a local curvature of the 3-D path to limit self-intersections between bent portions of the deformable tubular mesh model;

approximating the local curvature, and applying a radius modulation technique comprising a bi-cubic spline interpolation from one radius to another.

2. The image processing method of claim 1, wherein creating the deformable tubular mesh model comprises:

creating a tubular structure for fitting the 3-D path; and mapping the tubular structure onto a 3-D surface of the tubular object of interest, which is represented in a gray level 3-D image.

3. The image processing method of claim 2, wherein the deformable tubular model is created with one of 2-simplex meshes or triangular meshes.

4. The image processing method of claim 1, further comprising:

computing the 3-D path that corresponds to the centerline of the tubular object of interest and defining the path segments on the 3-D path;

creating an initial straight deformable cylindrical mesh model, of any kind of mesh, having a length along a longitudinal axis equal to a length of the 3-D path;

dividing the initial mesh model into segments of length corresponding to the path segments of the 3-D path; and computing, for each mesh segment of the initial mesh model, a rigid-body transformation that transforms an initial direction of the mesh segment into a direction of the corresponding path segment of the 3-D path, and applying the transformation to corresponding vertices of the mesh segment.

5. The image processing method of claim 4, further comprising:

blending the rigid-body transformations of consecutive mesh segments.

6. The image processing method of claim 4, further comprising:

computing rotations for the rigid-body transformations of consecutive mesh segments, wherein a linear interpolation is used between rotations of the consecutive mesh segments for blending the 3-D rigid body transformations to limit self-intersections between bent portions of the deformable tubular mesh model.

7. The image processing method of claim 1, further comprising:

determining a 3-D rotation comprising computing a minimal 3-D rotation from an initial mesh direction to a target segment to minimize mesh torsion.

8. The image processing method of claim 7, wherein determining the 3-D rotation further comprises:

defining rotation between segments using an axis parameter and a rotation angle parameter; and computing the parameters iteratively between adjacent segments so that a new rotation for a current segment comprises a composition of a found rotation for a previous segment and the minimal rotation from the previous segment to the current segment.

9. A medical viewing system comprising:

means for acquiring 3-D medical image data of a 3-D object of interest having substantially tubular parts;

a suitably programmed computer or a special purpose processor having circuit means arranged to process the image data according to the method as claimed in claim 1; and display means to display the medical images.

10. A medical examination apparatus comprising:

means to acquire a three-dimensional image of an organ of a body, the organ having substantially tubular parts; and a medical viewing system according to claim 9.

11. A method of automatically adapting a three-dimensional surface model of a substantially tubular object, the method comprising:

determining a three-dimensional path corresponding to a centerline of the tubular object;

defining a plurality of path segments on the three-dimensional path;

creating an initial straight deformable cylindrical mesh model having a length equal to a length of the three-dimensional path;

dividing the initial mesh model into a plurality of mesh segments corresponding to the plurality path segments;

computing a rigid-body transformation for each mesh segment for transforming an initial direction of each mesh segment into a path direction of the corresponding path segment;

applying the rigid-body transformation for each mesh segment to corresponding vertices of the mesh segment;

determining, for each mesh segment, a value that is a product of the initial radius and a local curvature of the corresponding path segment; and adapting a mesh radius for each mesh segment having the value greater than one, by applying a shrinking factor to the initial radius, wherein the shrinking factor is a constant for each of the mesh segments to be adapted, the constant value being less than one and based on the radius of local curvature of the corresponding path segment and the initial radius, wherein automatically adapting the mesh radius comprises, modulating the initial radius of the deformable tubular mesh model according to a local curvature of the 3-D path to limit self-intersections between bent portions of the deformable tubular mesh model;

approximating the local curvature, and applying a radius modulation technique comprising a bi-cubic spline interpolation from one radius to another.

12. The method of claim 11, further comprising:

performing linear blending on the rigid-body transformations of consecutive mesh segments.

13. The method of claim 11, wherein adapting the mesh radius of each mesh segment comprises reducing a diameter of the deformable cylindrical mesh model in highly curved portions of the three-dimensional path.

14. A non-transitory computer readable medium for storing a computer program thereon, wherein the program instructs a processor to process data for automatic adaptation of a three-dimensional surface model to image features by performing operations comprising:

creating a deformable tubular mesh model for fitting a three-dimensional path based on a centerline of a 3-D tubular object of interest, the three-dimensional path comprising a set of ordered points defining a plurality of path segments, the mesh model having an initial radius and comprising a plurality of mesh segments corresponding to the plurality of path segments;

determining, for each mesh segment, a value that is a product of the initial radius and a local curvature of the corresponding path segment; and automatically adapting a length of a mesh radius for each mesh segment having the value greater than one, by applying a shrinking factor to the initial radius, wherein the shrinking factor is a constant value for each of the mesh segments to be adapted, the constant value being less than one based on the radius of local curvature of the corresponding path segment and the initial radius, wherein automatically adapting the mesh radius comprises, modulating the initial radius of the deformable tubular mesh model according to a local curvature of the 3-D path to limit self-intersections between bent portions of the deformable tubular mesh model;

approximating the local curvature, and applying a radius modulation technique comprising a bi-cubic spline interpolation from one radius to another.

* * * * *